Oct. 14, 1969

E. BURNS 3,472,520

PACKER CONSTRUCTION

Filed Feb. 1, 1966

Inventors
Erwin Burns

By George A. Mahoney
Attorney

Oct. 14, 1969
E. BURNS
3,472,520
PACKER CONSTRUCTION
Filed Feb. 1, 1966
3 Sheets-Sheet 2
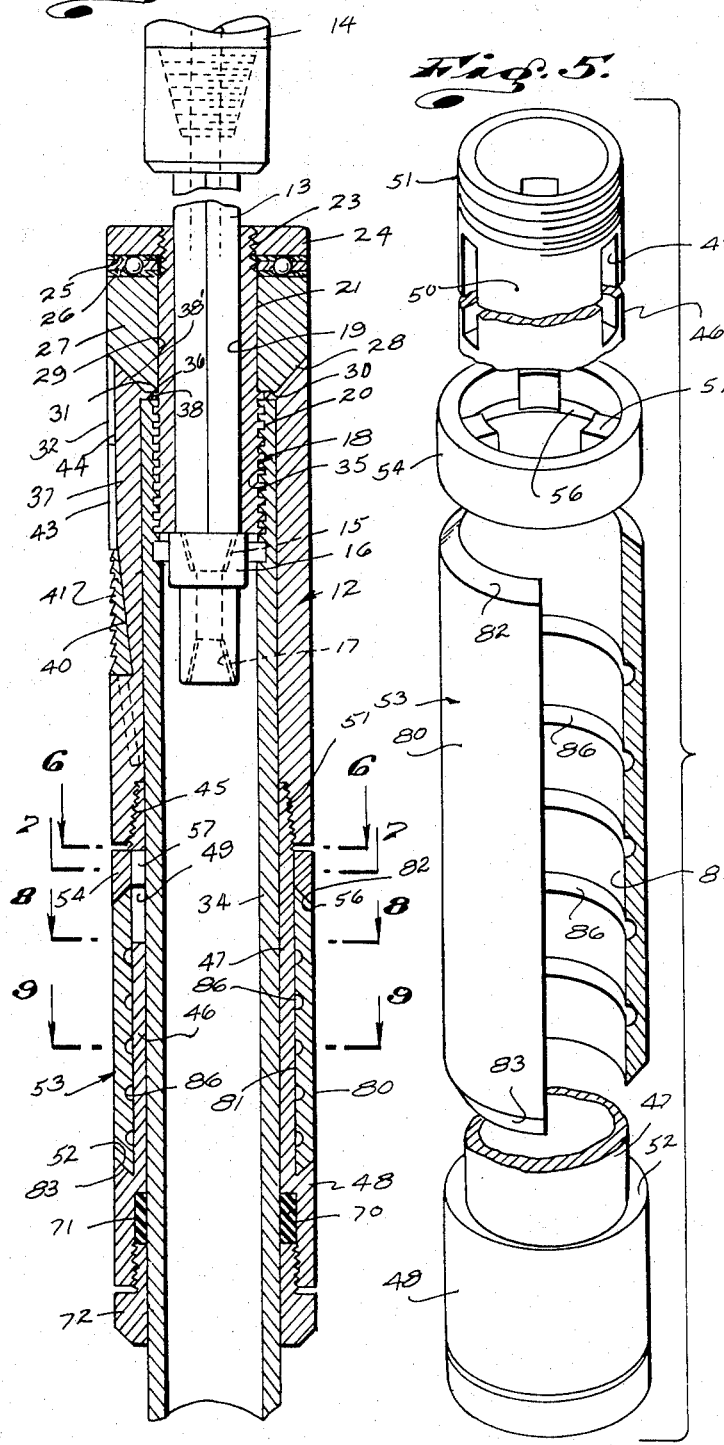
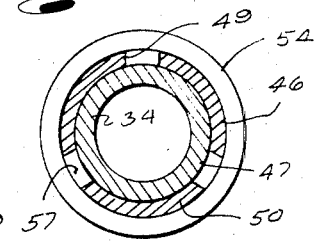
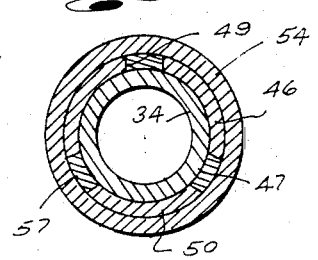
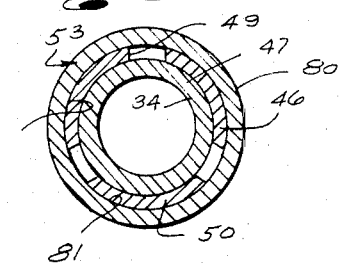
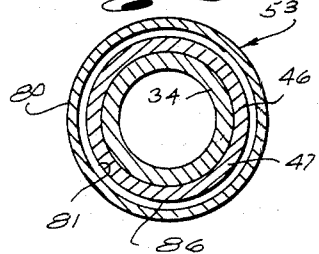
Inventors
Erwin Burns
By George A. Maxwell
Attorney Oct. 14, 1969     E. BURNS     3,472,520

PACKER CONSTRUCTION

Filed Feb. 1, 1966     3 Sheets-Sheet 3

Inventors
Erwin Burns

By
George A. Mosely
Attorney

# United States Patent Office 3,472,520
Patented Oct. 14, 1969

3,472,520
PACKER CONSTRUCTION
Erwin Burns, Los Angeles, Calif.
(8346 Salt Lake Ave., Bell, Calif. 90201)
Filed Feb. 1, 1966, Ser. No. 536,200
Int. Cl. E21b 33/128; F16j 15/00
U.S. Cl. 277—116.2                    11 Claims

ABSTRACT OF THE DISCLOSURE

A packer to seal an annulus defined by an elongate outside member with a radially inwardly disposed cylindrical surface and an elongate inside member with a radially outwardly disposed surface spaced from and opposing said inwardly disposed surface, including, an elongate tubular sleeve of readily bendable metal, such as annealed brass, arranged adjacent the surface of one of said members and normally spaced from the surface of the other member, axially spaced parts carried by said one member and engaging the opposite ends of the sleeve, means related to one of said parts to shift said part axially toward the other part and to compress the sleeve axially therebetween, the sleeve having a plurality of axially spaced, annular relief grooves defining bend lines whereby those portions of the sleeve between the grooves pivot relative to each other and radially away from said one surface and into pressure sealing engagement with the other surface when the sleeve is compressed axially.

---

This invention has to do with a packer construction and is more particularly concerned with an improved copper, heat resistant packer construction for use in connection with oil well structures and the like.

In the art of oil production, well bores are drilled through the earth's formation into an oil producing zone; the well bores are lined and/or supported by steel casings, which casings are sealed in and with the surrounding formation as by means of cement, or the like. A string of production tubing is lowered into and through the casing and is provided at its lower end with a perforated liner or screen which depends from the production tubing into the production zone. A pump is lowered into and is seated at the lower end of the production tubing and serves to move oil from within the liner, upwardly through the tubing and to the surface of the well structure.

In following the above procedure, it is necessary that the annulus between the tubing and the casing, at the lower end portion of the tubing and casing, be sealed or packed off so as to prevent water and the like, occurring in the said annulus above the open lower end of the casing and above the production, from flowing into the production zone and imposing undesired hydrostatic heads of pressure thereon, as well as to prevent the escape of gas and/or production fluid up through said annulus.

Accordingly, it is common practice to provide packer constructions between a casing and a related production tubing, at the lower ends thereof.

Another typical situation where packer constructions are employed is where a casing of reduced diameter is joined with a previously set, larger diameter casing to depend and extend downwardly into a well bore therefrom. In such situations, it is necessary to establish a seal between the two unsimilar sized casings, at their points of joindure.

The art of oil well packers is extremely old and highly developed. Typical packer constructions involve rubber, fluid pressure actuated, annular packer cups fixed to production tubing strings and/or special production tools, such as liner hangers. Such rubber cup-type packers engage and seal with the inner walls of their related casings. Other packer constructions involve expansible rubber sleeves related to special tools, such as liner hangers, casing hangers and the like, which sleeves are expanded into sealing engagement with and between their related structures when the tool with which they are related are actuated and/or set. Yet another form or type of packer construction involves an annular body of soft and malleable lead, which takes the place of or is used instead of an annular body of rubber, as set forth above.

In recent years, the oil production art has made noticeable advancements in secondary recovery, that is, in the art of stimulating the flow and obtaining increased production from oil producing formations which were previously considered exhausted or so depleted that production was no longer economical or feasible. The most recent and most effective methods employed in secondary recovery have involved the thermal treatment of the oil bearing formation or sands, that is, heating the production formation or sands by the injection of super-heated steam into said formations or by igniting and maintaining combustion of gas and/or production fluid in the formation. Both of these methods result in heating the sands and the production and induce the free flow of production.

In both of the above-noted methods of inducing the flow of production fluid by steam injection, the heat may be applied intermittently, that is, the steam is injected into the production zone for predetermined periods of time. When it is determined that sufficient heat has been generated and absorbed by the formation, the flow of steam is shut off or the combustion is extinguished and the wells are produced continuously and until the effect of the heating is spent, whereupon production is shut off and the heating operation is repeated.

In carrying out the ignition or the steam injection methods above noted, a separate well structure is established between a number of production wells and steam or ignition heating is carried out continuously.

At least two major and serious difficulties have developed as a result of thermal treatment of wells, as set forth above, which are:

(1) The temperatures generated are greater than ordinary or conventional packer constructions can withstand; and (2) The heating and cooling effect experienced in carrying out such methods results in expansion and contraction of the casings and tubings, which expansions and contractions is the lower end of the tubing relative to the casing. Such shifting can vary from several inches to several feet, depending upon the particular well structure.

The above-noted relative shifting between the lower ends of the casings and tubings is a factor not previously encountered and a factor which ordinary or conventional packer constructions are not designed for and which they cannot withstand.

The heat factor above noted is also destructive or highly detrimental to existing packer constructions, as the temperatures encountered are frequently well above the maximum temperatures which rubber or synthetic rubber compounds can withstand and well above the melting point of lead.

As a result of the inability of available packer constructions to withstand the temperatures and the relative working of the tubings and casings encountered in thermal treated oil wells, such teatment of wells has been materially restricted and cannot be taken full advantage of.

An object of my invention is to provide a novel packer construction which is such that it is not adversely affected by and can advantageously withstand the temperatures and relative movement of parts encountered in thermally treated well structures.

Another object of my invention is to provide a circumferentially and radially expandable copper sealing and/or packing ring which is such that it can be advantageously expanded to establish a fluid tight seal in an annulus defined by a well casing and a string of production tubing, with related production tubes.

Yet another object of my invention is to provide a novel means for expanding an expansible copper packing ring into sealing engagement with related well structure.

It is to be noted that, while copper is highly malleable and ductile, it has a rather low modulus of elasticity and is such that when drawn or stretched it tends to rupture and part. As a result, a circumferentially and radially expansible copper packing ring, such as here provided, must be such that it can be caused to flow and shift into desired sealing form and condition without being drawn or stretched in such a manner as will result in parting and rupturing of the copper mass and resulting failure as a seal.

It is an object of my invention to provide a copper sealing or packing ring and actuating means therefor, which are such that the copper mass is not tensioned or drawn in such a manner as to result in rupturing of the material, but which effectively urges the copper mass radially and circumferentially in such a manner as to establish an effective and dependable seal.

As a result of the highly malleable and ductile characteristics of copper, copper can be easily and advantageously flared, within limits and can be urged into intimate and sealing contact with opposing, irregular surfaces. Still further due to the relative low tensile strength and low shear strength of copper, it will readily result in a mechanical transfer of material onto and opposing irregular surface upon relative movement between the copper mass and such a surface. Such transfer of material is effective to establish an opposing copper sealing surface upon which the copper mass can subsequently freely shift without further transfer of material or reduction of the primary mass of copper.

It is an object of this invention to provide an imperforate, annular, copper packing sleeve having a plurality of annular, axially spaced relief grooves which cause the sleeve to accordion in a predetermined manner when compressed axially, a conical bore adapted to cooperatively receive an axially shiftable expander cone.

It is another object of my invention to provide an elongate annular sleeve of the character referred to having tapered seats at its opposite ends to cooperatively receive and seal with relative axially shiftable tapered pressure or force exerting parts of a related tool structure.

It is another object to provide a tool structure having a cylindrical member about which the sleeve is engaged, which member limits radial inward shifting of the sleeve when it is compressed axially, causing it to expand radially outwardly and with which the sleeve seals.

It is a further object of this invention to provide a sealing sleeve of the character referred to which is such that it establishes uniform sealing engagement with parts and members engaged about its exterior and extending through its interior at longitudinally spaced points.

The various objects and features of my invention will be fully understood from the following detailed description of typical preferred forms and applications of my invention, throughout which description reference is made to the accompanying drawings, in which:

FIG. 4 is a longitudinal sectional view taken substantially as indicated by line 4—4 on FIG. 1;

FIG. 5 is an exploded isometric view showing portions of my new construction;

FIG. 6 is a sectional view taken as indicated by line 6—6 on FIG. 4;

FIG. 7 is a transverse sectional view taken substantially as indicated by line 7—7 on FIG. 4;

FIG. 8 is a transverse sectional view taken substantially as indicated by line 8—8 on FIG. 4;

FIG. 9 is a transverse sectional view taken substantially as indicated by line 9—9 on FIG. 4;

Figure 1:
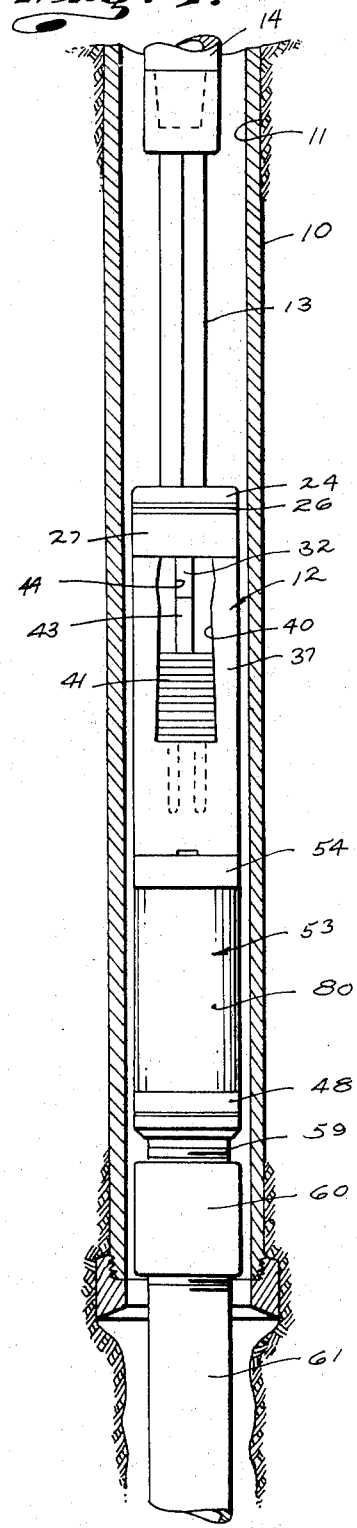
FIG. 1 is a longitudinal elevational view showing my new packer ring construction related to a liner hanger and positioned in a well structure preparatory to being actuated into sealing engagement.

Referring to that form of the invention illustrated in FIGS. 1 through 9 of the drawings, 10 indicates a well casing which is set within a well bore 11 and within which a liner hanger 12 is mounted. The liner hanger is shown as including a stem 13 which is threaded into the lower end of a drill pipe joint 14. This stem is square in cross-section and has a lower threaded end 15 which threadedly receives a nut 16. The nut 16 is internally threaded as at 17 and, in practice, receives the threaded end of a suitable length of tubing through which circulating fluid or cement may be forced downwardly into the liner, when the well is being established. The square stem 13 extends through a liner nut 18 of the setting tool. This nut has a central bore of square, cross-section, as indicated at 19, and through which the stem 13 may slide longitudinally while positively engaging the nut to impart rotation thereto. The exterior surface of the lower cylindrical portion of the liner nut is formed with square left-hand threads 20. The upper portion of the nut is cylindrical, as indicated at 21. The upper end of this cylindrical portion is threaded at 23 to receive an annular bearing nut 24. The bearing nut 24 has a lower shoulder forming a ball race 25 which rests on an annular bearing 26. The bearing 26 is shown as a typical anti-friction ball bearing construction. The bearing rests upon the upper end face of the sleeve 27 of the setting tool. The sleeve 27 is cylindrical and is formed at its lower end with a conical face 28. A cylindrical bore 29 is formed in the sleeve and the sleeve has a running fit with the upper cylindrical portion 21 of the nut 18. The lower end of the sleeve is machined or turned down and forms a square shoulder 30 which rests against a shoulder 31 at the upper end of the threaded section 20 of the nut. This restrains the sleeve 27 from longitudinal movement upon the extension 21 of the nut 18.

Figure 2:
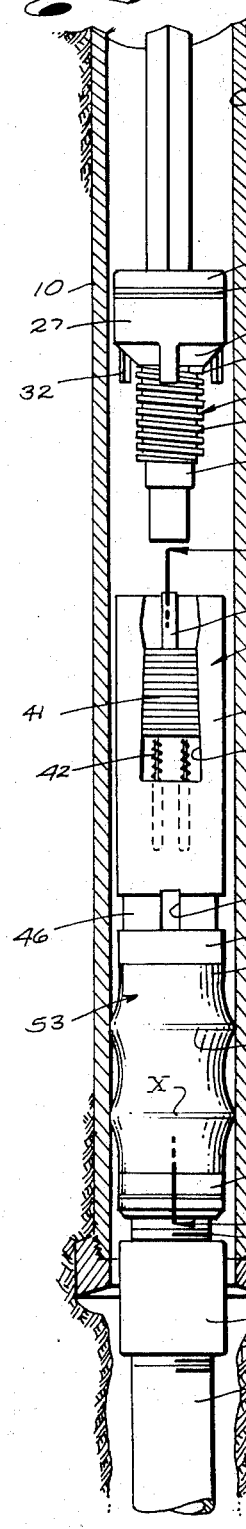
FIG. 2 is an elevational view of the structure illustrated in FIG. 1 and showing it in an actuated position.
Figure 3:
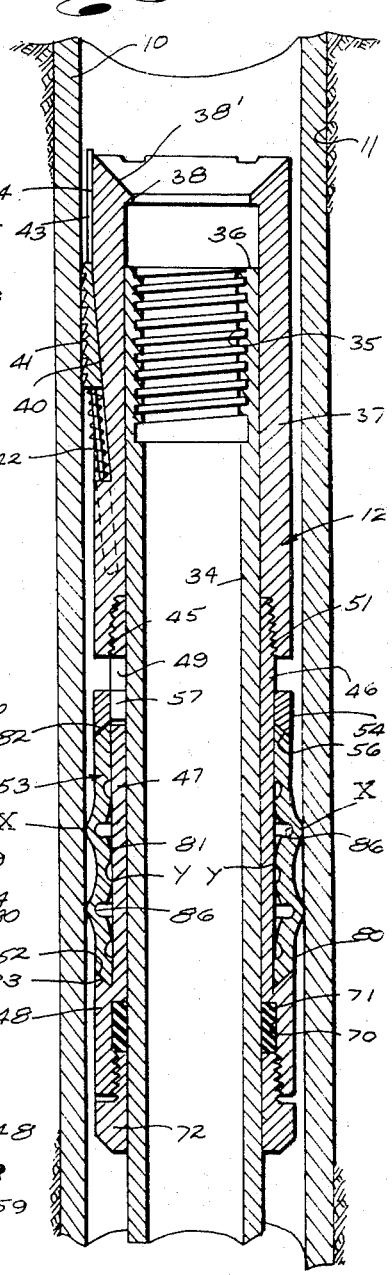
FIG. 3 is a longitudinal sectional view of the structure taken substantially as indicated by line 3—3 on FIG. 2.

Extending downwardly from the sleeve 27 are a plurality of circumferentially spaced slip-engaging fingers 32, which fingers are mounted on the outer circumference of the sleeve 27 and overlie the threaded portion 20 of the nut 18, as shown in FIGS. 2 and 4 of the drawings.

Three fingers are here shown and their purpose will hereinafter be described.

The liner hanger is shown as including a tubular body 34, which is internally threaded at its upper end, as indicated at 35. The threads 35 are complementary to the threads 20 on the nut 18. The upper end of the body 34 is formed with a seat 36, the inner peripheral portion of which opposes the shoulder 30 of the sleeve 27. Slidably mounted upon the tubular body member 34 is a slip barrel 37. The slip barrel 37 is provided with a radially inwardly projecting flange 38 at its upper end, which flange engages the seat 30 at the upper end of the body 35 and prevents downwardly shifting and displacement of the slip barrel on the body 34. The barrel is further provided with a radially outwardly and upwardly inclined seat 38' in and upon which the face 28 of the sleeve 27 normally seats and stops. Formed within the cylindrical outer face of the slip barrel 37 are guideways 40 which receive wickered slips 41. The wickered slips 41 are designed to move upwardly and outwardly in the guideways 40. A plurality of springs 42 are mounted in the barrel at the heel of the slips to normally yieldingly urge the slips upwardly in the guideways. The upper end of each slip is formed with a finger 43, which finger is slidably engaged in a longitudinal slot 44 provided in the exterior of the barrel adjacent the guideway 40 in which the related slip is engaged. The fingers 32 and 43 are in longitudinal and axial alignment when the sleeve 27 is in its lowermost position. The fingers 32 engage the fingers 43 and force the slips downwardly in their related guideways 40 and hold them retracted so that they will not grip the wall of the casing 10, until they are released.

The lower end of the slip barrel 37 is internally threaded as indicated at 45. The lower end of the barrel threadedly receives the upper end of a packer cage 46. The packer cage 46 is shown as having a substantially cylindrical upper body portion 47 and an enlarged lower collar portion 48. The body portion is cut away at intervals about its circumference to establish elongate slot-like apertures 49 therein and to define longitudinal wall portions 50 between the said apertures. The upper end of the cylindrical portion 47 is externally threaded as indicated at 51 and is threadedly engaged into the threaded bore 45 of the slip barrel 37. It will be seen that the enlarged collar portion 48 is of a diameter greater than the cylindrical body portion 47 and cooperates therewith to establish a shoulder 52. In the case illustrated, the shoulder 52 is conical in form, that is, it is radially inwardly and upwardly disposed and is adapted to engage the lower end of a packer sleeve.

Engaged around the body portion 47 of the cage above the collar portion is an elongate packer sleeve 53. The details of the packer sleeve 53 will be more fully described in the following.

It will be apparent from a study of the drawings, that the packer sleeve is cylindrical and is normally equal in outside diameter with the enlarged collar portion 48 of the cage.

The length of the packer sleeve is such as to assure space between its upper end and the lower end of the slip barrel (when the sleeve is seated on the shoulder 52) to receive an annular actuating ring 54. The outer diameter of the ring 54 is equal with the outer diameter of the slip barrel and enlarged collar portion of the cage, and is therefore equal with the outside diameter of the packer sleeve when said sleeve is in its normal position.

The actuating ring is provided with an annular upwardly and inwardly disposed, conical shoulder 56 at its lower end, which shoulder engages the upper end of the sleeve, as will hereinafter be described.

In addition to the foregoing, the actuating ring is provided with circumferentially spaced, radially inwardly projecting arcuate lugs 57. The lugs 57 are fixed in the ring as by welding.

The lugs 57 extend through the slot openings or apertures 49 in the packer cage and have their inner portions fixed to the exterior of the body, as by welding.

The lugs 57 are less in longitudinal extent than the openings 49 and normally occur in stopped position at the upper ends of said slots. The construction shown is further provided with a suitable sealing means S at the lower end of the packer cage 46, below the packer sleeve 53 and adapted to establish a fluid tight seal between the cage and the body and thereby prevent the flow of fluid upwardly between the casing and the body, past the packer sleeve, after the construction has been actuated.

In the particular case illustrated, the sealing means S is shown as including a downwardly opening socket 70 entering the lower end of the enlarged collar 48 at the lower end of the cage and through which the body 34 extends, an annular body of deformable sealing material 71 engaged in and seated on the bottom of the socket 70 and slidably receiving the body 34, and an annular follower nut 72 slidably engaged about the body and threadedly engaged into the socket from the open bottom end thereof and adapted to be advanced into the socket and to engage the packing 71 urging it into tight sealing engagement with the body.

The other or lower end of the body 34 extends downwardly below the cage 46 a desired distance and is externally threaded as at 59 to receive a coupling collar 60, into which is threaded the upper end of a perforated liner 61.

Referring now to the packer sleeve 53 and its particular constructon and relationship with those other elements of the tool with which it is directly related, the sleeve 53 is a unitary, cast and suitably machined part formed of pure, annealed, soft, ductile and malleable copper. The exterior of the sleeve has a straight cylindrical outer surface 80, which surface is coextensive with the longitudinal extent of the sleeve. The interior of the sleeve is provided with or defines a straight, cylindrical bore 81, which bore normally slidably engages about the upper portion of the cage 46. The upper and lower ends of the sleeve are provided with radially and axially outwardly disposed conical seats 82 and 83 on which the shoulders 56 and 52 seat and establish tight wedging and sealing engagement.

In practice, the seat 82 and 83 and the shoulders 56 and 52 related thereto, are disposed at 45' to the axial of the construction and are so related that when the sleeve is subjected to axial compressive forces between the ring and the collar, the shoulders hold the ends of the sleeve captive, urge them radially inward and tight against the cage and establish wedging sealing engagement therewith.

The packer sleeve is further provided with a plurality of longitudinally spaced, radially inwardly opening annular relief grooves 86, which grooves in the case illustrated, are radiused or concaved.

The grooves 86 are of such depth that they extend outwardly in the wall of the sleeve at least to, or slightly beyond, the central plane of the sleeve wall and suitably weaken the wall to a predetermined extent.

In practice, there is an uneven number of grooves and in the preferred carrying out of the invention, there are, as illustrated, at least five such grooves, though a sleeve with three grooves could effect a desired seal.

In practice, as illustrated, the uppermost groove 86 is below the lower ends of the slot openings or apertures in the cage.

When the tool is actuated and the sleeve is compressed axially, those portions of the sleeve occurring above and below the uppermost and lowermost grooves, by virtue of the manner in which the tapered ends of the sleeve are engaged by the tapered shoulders related thereto, remain in substantially straight, flat engagement about the cage.

The reduced wall thickness of the sleeve at the uppermost and lowermost grooves tends to permit the next adjacent, longitudinally inward portions of the sleeve to swing or pivot relative to the end portions. Since the said next adjacent portions cannot swing or pivot inwardly, due to the presence of the cage, they swing or move outwardly.

The grooves next adjacent to the end grooves, that is, the second grooves from the ends of the sleeve, allow or permit the next two adjacent central portions of the sleeve and occurring between the two second grooves and the common central groove, swing or pivot relative to each other and inwardly relative to said next adjacent portions of the sleeve.

As a result of the above, and since the cage prevents the sleeve from collapsing radially inwardly, the ports of the sleeve occurring radially outwardly of the second grooves are urged radially outwardly and establish annular, uninterrupted sealing contact with the opposing, adjacent wall of the casing, as indicated at X. The edges defined by the central groove and the inner surface or bore of the sleeve establish annular, uninterrupted sealing contact with and about the cage, as indicated at Y.

Accordingly, the two point sealing contact is established between the inside of the sleeve and the cage and between the outside of the sleeve and the casing.

Upon the application of increased compressive forces onto and through the sleeve, the annular sealing lines or points X and Y are urged into engagement with their opposing surfaces of the cage and casing with such force that the copper is caused to flow and to conform to or with said surfaces and in such a manner as to establish a positive fluid tight seal.

Due to the inclined relationship of the several portions of the sleeve between adjacent grooves, a mechanical advantage is attained, which advantage assures that sufficient forces will be applied and exerted at said sealing lines or points of contact X and Y to effect the desired seal.

It will be apparent that the number of contact points X and Y can be increased, if desired, by increasing the number of grooves to 7, 9, 11 or more.

If desired, and particularly in situations where the number of grooves is increased above 5, the grooves which are to establish the inner bends in the sleeve and the sealing lines Y, can be slightly less in radial extent or cross-section than the other, adjacent or intermediate grooves, whereby there is less tendency for the wall of the sleeve to bend at such points and to remain radially in. Such a relationship of parts is shown in FIG. 11 of the drawings and is such as to assure proper operation and/or accordioning of the sleeve.

It will be apparent that as the several portions of the sleeve, occurring between the grooves, swing or pivot relative to each other and as increased pressures are exerted onto and through the sleeve, the said portions of the sleeves may bow or bend slightly, but such bowing or bending in no way adversely affects the operation of and sealing effect of the sleeve.

Figure 12:
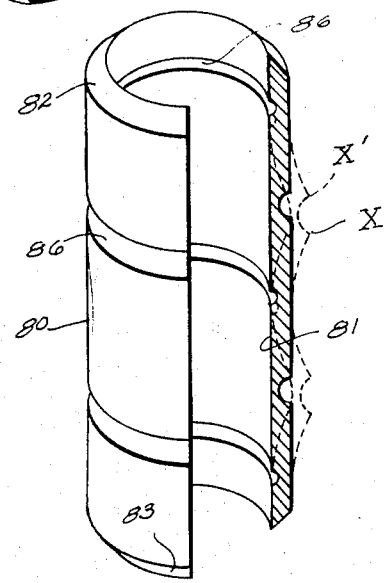
FIGS. 12 and 13 are sectional views of modified forms of packer sleeves provided in accordance with the instant invention.
Figure 13:
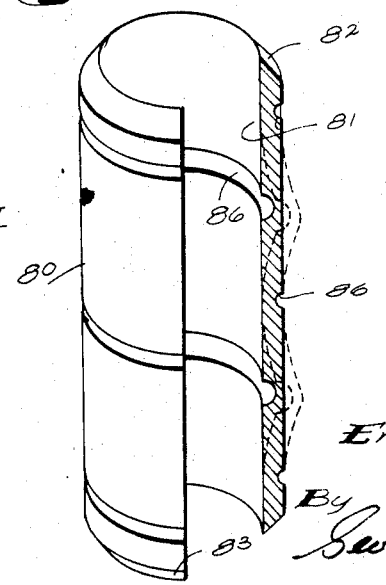

In the form of the invention illustrated in FIG. 12 of the drawings, the adjacent grooves are arranged or established alternately in the inside and outside of the sleeve. In this form of the invention, the edges of the outwardly disposed grooves establish spaced lines of sealing contact X', in the same manner as the sealing lines Y in the first form of the invention and as indicated in dotted lines.

Figure 11:
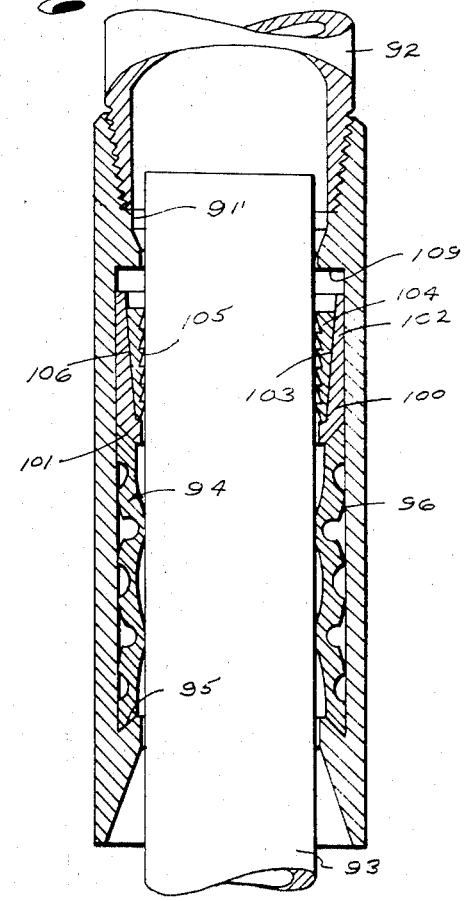
FIG. 11 is a view similar to FIG. 10 and showing the casing bowl structure and its related seal in another or actuated position.

In the above or last-mentioned form of the invention, the inwardly disposed grooves are of less extent than the outwardly disposed grooves, to gain the same control or effect as was discussed above in considering the form of the invention shown in FIG. 11.

In practice and as illustrated, the slot-like apertures 49 in the cage 46 are of sufficient longitudinal extent to afford the necessary axial shifting of the ring 54 and its related lugs 57, but terminate above the uppermost groove in the related sleeve, when the construction is in its normal or unactuated position and so that the operations do not interfere with the seal established between the sleeve and the cage.

In operation of the present invention, and when the liner hanger is assembled and set in the manner illustrated in FIG. 1 and FIG. 4 of the drawings, it is ready to be run into the well bore 11. It is to be noted that in the event the lower end of the packer cage 46 should strike an object or meet resistance while being lowered into the casing, it will in no way affect the tool and the tool will remain in its set assembled position, since the packer 46 is directly connected or coupled to the setting tool by the threaded connection 35, and the slip barrel, in turn, is held against longitudinal movement by means of the sleeve 27 which is held by the hanger nut 18. It will be seen that no amount of thrust on the lower end of the cage 46 will ever deform the packer sleeve 53.

When the structure is lowered into the well, the liner 61 is engaged with and depends freely from the lower end of the liner hanger body 34. Due to the length of the stem 13, it is possible for the hanger to have considerable longitudinal movement on the stem so that the hanger and liner may be manipulated sufficiently to facilitate the handling of the table slips and the other means used at the surface of the well. When the liner has reached the desired point in the well, rotation of the drill pipe 14 to the right will impart similar rotation to the stem 13 and will result in positive rotation of the hanger nut 18.

The nut will then advance longitudinally upwardly. The movement will move the sleeve 27 upwardly due to the butting engagement of the shoulders 30 and 31. As previously explained, the sleeve 27 carries the fingers 32. The fingers 32 will move upwardly and away from their abutting engagement with the fingers 43 carried by and projecting upwardly from the wickered slips 41. This permits the springs 42 at the heel of the slips to force the slips upwardly and radially outwardly into engagement with the inner face or surface of the casing 10 engaged in the well bore 11. At this time the sleeve 27 is held against rotation due to the fact that the fingers 32 on the sleeve extend into the longitudinal slots 44 provided in the slip barrel 37. When relative rotation takes place between the nut 18 and the sleeve 27, the antifriction bearing 26 serves to reduce frictional resistance. When the slips 41 engage the wall of the casing with sufficient force to hold the hanger in position and the nut 18 is further rotated and shifted out of engagement from the body 34, the weight of the liner is transmitted directly onto the actuating ring 54 through the body. This weight is imposed by the ring 54 upon the packer sleeve 53 to compact or compress it axially between the shoulders 52 and 56, thereby causing it to accordion and expand radially outwardly and to bear radially inwardly into tight sealing engagement between the cage and the casing.

When the construction is actuated and set in the manner described above, the body 34 shifts downwardly through the packing cage 47.

It will be apparent that the sealing means S at the lower end of the cage in no way interrupts the operation of the device and suitably seals between the cage and the body after the construction is set.

Figure 10:
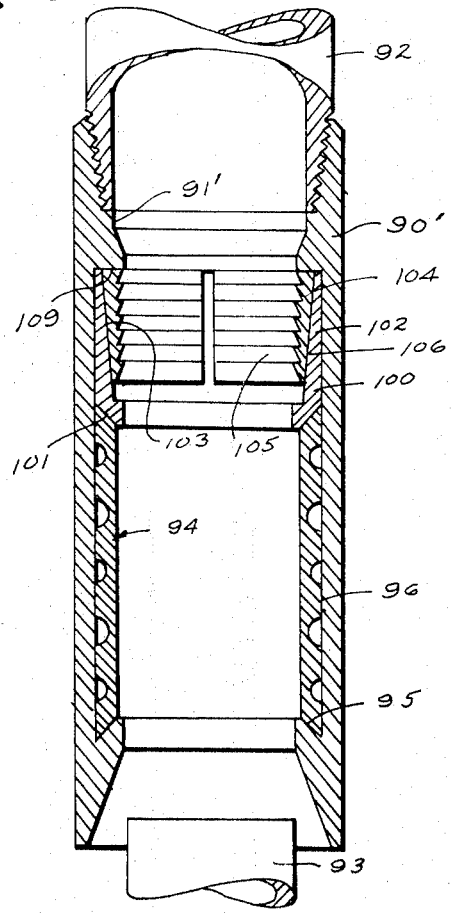
FIG. 10 is a longitudinal sectional view of a casing bowl construction with a sealing structure as provided by the present invention related thereto.

In the form of the invention illustrated in FIGS. 10 and 11 of the drawings, we have shown our new copper packer sleeve construction employed in a casing bowl, that is, a tool employed to repair a damaged casing by, in effect, splicing two sections of a casing, from which a section has been removed, together.

The casing bowl illustrated includes an elongate, tubular body 90' having a central bore 91', the upper end of which threadedly receives the lower end of the upper portion of the string of casing 92, which has been severed from the casing string which was previously set in the well and from which a damaged portion has been removed. The lower end of the body is open to freely receive the upper end of the lower portion 93 of the casing which is set in the well.

Arranged within the body 90' is an annular packing sleeve 94, the lower end of which is seated on an annular axially upwardly disposed shoulder 95 in the lower portion of the body. The sleeve 94 is similar to the sleeve in the first form of the invention, except that the straight, uninterrupted cylindrical surface extends through the sleeve and is disposed radially inwardly in order to engage and seal about the exterior of the lower section 93 of the casing and the grooved or relieved surface 96, rather than being inside and defined by a bore, occurs at the exterior of the sleeve.

Further, since this form of sleeve is designed to work in reverse from the first form of the invention, that is, since it is constricted or contracted into sealing engagement with the casing section with which it is related, arranged above and about the exterior of the sleeve and slidably engaged in the body is an actuating ring 100, which ring has a lower portion with a flat lower end or shoulder 101 to engage the upper end of the sleeve 94 and an upper slip carrying portion 102 having an upwardly divergent or conical bore 103 in which a split ring 104 having a wickered casing engaging bore 105 and a downwardly convergent exterior 106 is slidably engaged. The split wickered ring 104 allows the lower section 93 of the casing to slide upwardly therethrough, but is such that upon downwardly shifting of said casing relative to the tool, as results when the upper section is elevated, the ring grips the casing and is drawn downwardly in the conical bore 103 of the actuating ring. This urges the wickered ring into tight gripping and holding engagement with and about the lower casing section. Upon further downwardly shifting of the lower casing section, the actuating ring is urged downwardly relative to the packing sleeve 94 and the sleeve is urged into sealing engagement about the casing section in essentially the same manner as the packing ring engages and seals with the casing in the first form of the invention.

The body 90′ is further provided with an annular downwardly disposed upper stop shoulder 109, which shoulder occurs above the other elements of the construction and prevents vertical displacement of said other elements from within the body.

Referring again to the first form of the invention, after the tool has been set, it is common practice to set the liner in the well bore, by a suitable gravel packing operation. As a result of setting the liner in the well bore, it will be apparent that in the event the well structure is thermally treated, and the liner is caused to expand longitudinally, the liner will shift a limited distance longitudinally of and relative to the lower end of the set casing. When such relative movement occurs, the packing sleeve is not adversely affected, but will slide relative to and on the bore of the casing without destroying the seal established therebetween.

From the foregoing, it will be apparent that we have provided a novel and improved packer sleeve construction which is highly effective and dependable, especially in situations where high temperatures are encountered and where axial movement or shifting of the seal may be encountered.

Having described only typical preferred forms and applications of our invention, we do not wish to be limited or restricted to the specific details herein set forth, but wish to reserve to ourselves any modifications and/or variations that may appear to those skilled in the art.

Having described my invention, I claim:

1. A packer construction to seal the annulus defined by an elongate outside member with a radially inwardly disposed cylindrical surface and an elongate inside member with a radially outwardly disposed surface spaced from and opposing said inwardly disposed surface, including; an elongate tubular sleeve of bendable metal adjacent the surface of one of said members and normally spaced from the surface of the other member, axially spaced parts carried by said one member and engaging the opposite ends of the sleeve, means related to one of said parts to shift said part axially toward the other part and to compress the sleeve therebetween, the sleeve having a plurality of axially spaced, annular relief grooves defining bend lines whereby the portions of the sleeve in which said grooves occur bend and the ends of the intermediate portions of the sleeve between the grooves adjacent one of said grooves distend circumferentially and move radially away from said one member and urge the portion of the sleeve in which said one groove occurs into pressure sealing engagement with the surface of said other member and the other ends of said intermediate portions adjacent the next adjacent grooves maintaining bearing contact on said one member when the sleeve is compressed axially.

2. A structure as set forth in claim 1 wherein there is an uneven number of grooves in the sleeve whereby the end portions of the sleeve remain in axial alignment with and adjacent to said one member when the sleeve is compressed axially.

3. A structure as set forth in claim 1 wherein the parts have axially inclined surfaces disposed axially of and radially toward the surface of said one member and the ends of the sleeve have conical end surfaces opposing the inclined surfaces on their related parts whereby said parts establish wedging engagement with the ends of the sleeve and urge and hold the ends of the sleeve against the surface of said one member when the sleeve is compressed axially by and between said parts.

4. A structure as set forth in claim 1 wherein the parts have axially inclined surfaces disposed axially of and radially toward the surface of said one member and the ends of the sleeve have conical end surfaces opposing the inclined surfaces on their related parts whereby said parts establish wedging engagement with the ends of the sleeve and urge and hold the ends of the sleeve against the surface of said one member when the sleeve is compressed axially by and between said parts, said sleeve having an uneven number of grooves whereby the end portions of the sleeve remain in axial alignment with and adjacent said surface when the sleeve is compressed axially.

5. A structure as set forth in claim 1 wherein the number of grooves is odd and wherein the endmost grooves and every other groove adjacent thereto is of less depth than the intermediate grooves related thereto whereby the portions of the sleeve adjacent to said intermediate grooves bend more readily than the portions of the sleeve adjacent to the other grooves and whereby the ends of the portions of the sleeve between the grooves adjacent said intermediate grooves shift radially away from the surface of said one member when the sleeve is compressed axially between said parts.

6. A structure as set forth in claim 1 wherein there is an uneven number of grooves in the sleeve whereby the end portions of the sleeve remain in axial alignment with and adjacent said one member when the sleeve is compressed axially, the endmost grooves and every other groove spaced therefrom being in one surface of the sleeve and disposed radially in one direction and away from said one member, the intermediate grooves being in the other surface of the sleeve and disposed radially in the opposite direction and toward said one member, whereby the ends of the portions of the sleeve between the grooves adjacent to the intermediate grooves pivot radially away from said one member.

7. A structure as set forth in claim 1 wherein the number of grooves is odd and wherein the endmost grooves and every other groove adjacent thereto is of less depth than the intermediate grooves related thereto whereby the portions of the sleeve adjacent to said intermediate grooves bend more readily than the portions of the sleeve adjacent to the other grooves, whereby the ends of the portions of the sleeves between the grooves adjacent said intermediate grooves shift radially away from the surface of said one member when the sleeve is compressed axially between said parts, the end most grooves and every other groove spaced therefrom being in one surface of the sleeve and disposed radially in one direction and away from said one member, the intermediate grooves being in the other surface of the sleeve and disposed radially in the opposite direction and toward said one member, whereby the ends of the portions of the sleeve between the grooves adjacent to the intermediate grooves pivot radially away from said one member.

8. A structure as set forth in claim 1 wherein the parts have axially inclined surfaces disposed axially of and radially toward the surface of said one member and the ends of the sleeve having conical end surfaces opposing the inclined surfaces on their related parts whereby said parts establish wedging engagement with the ends of the sleeve and urge and hold the ends of the sleeve against the surface of said one member when the sleeve is compressed axially by and between said parts, said sleeve having an uneven number of grooves whereby the end portions of the sleeve remain in axial alignment with and adjacent the surface of said one member when the sleeve is compressed axially, the grooves adjacent to the end most grooves and every other groove related thereto being disposed to open radially toward the surface of said other member whereby the edges defined by those grooves and the adjacent portions of the sleeve occurring between the grooves define axially spaced sealing edges which engage the surface of said other member when the sleeve is compressed axially.

9. A structure as set forth in claim 1 wherein the parts have axially inclined surfaces disposed axially of and radially toward the surface of said one member and the ends of the sleeve having conical end surfaces opposing the inclined surfaces on their related parts whereby said parts establish wedging engagement with the ends of the sleeve and urge and hold the ends of the sleeve against the surface of said one member when the sleeve is compressed axially by and between said parts, said sleeve having an uneven number of grooves whereby the end portions of the sleeve remain in axial alignment with and adjacent the surface of said one member when the sleeve is compressed axially, said end grooves and every other groove related thereto being disposed to open radially toward said one member whereby said every other groove cooperates with the ends of the intermediate portions of the sleeve adjacent thereto to define axially spaced, annular sealing edges to engage and seal with the surface of said one member.

10. A structure as set forth in claim 1 wherein the parts have axially inclined surfaces disposed axially of and radially toward the surface of said one member and the ends of the sleeve having conical end surfaces opposing the inclined surfaces on their related parts whereby said parts establish wedging engagement with the ends of the sleeve and urge and hold the ends of the sleeve against the surface of said one member when the sleeve is compressed axially by and between said parts, said sleeve having an uneven number of grooves whereby the end portions of the sleeve remain in axial alignment with and adjacent said surface of said one member when the sleeve is compressed axially, said end grooves and every other groove related thereto being disposed to open radially toward said one member whereby said every other groove cooperates with the ends of the intermediate portions of the sleeve adjacent thereto to define axially spaced, annular sealing edges to engage and seal with the surface of said one member, the intermediate grooves between said end and every other groove disposed to open radially toward said other member whereby the edges defined by said intermediate grooves and the adjacent ends of the intermediate portions of the sleeve define axially spaced annular sealing edges to engage and seal with the surface of said other member.

11. A packer assembly comprising an elongate, vertically disposed tubular body having a central flow passage and a straight cylindrical exterior, an elongate tubular packer cage having upper and lower ends engaged about the body to engage a supporting member at its upper end, said cage having a straight, cylindrical bore establishing sliding bearing engagement with the exterior of the body throughout the longitudinal extent of the cage, the lower end of the cage being formed with a shoulder in a plane transverse the longitudinal axis of the cage and extending axially therefrom, the wall of the cage being formed with a plurality of longitudinally extending and circumferentially arranged slotted openings in its upper end, an elongate, vertically disposed tubular bendable metal packer sleeve engaged about and carried by the cage and being of a thickness substantially equal to the radial extent of the shoulder on the cage, said packer sleeve having a plurality of radially inwardly opening axially spaced relief grooves, the uppermost groove occurring below the slotted openings, an actuating ring at the upper end of the cage having an outside diameter substantially equal with the outside diameter of the packer sleeve, an inside diameter substantially equal with the outside diameter of the cage and having a downwardly disposed shoulder engaging the upper end of the sleeve, said ring carrying lugs which extend through the slotted openings, said lugs being fixed to the body whereby downward movement of the body and the ring compresses the sleeve axially and the portions of the sleeve adjacent the grooves bend and the ends of the portions of the sleeve between the grooves adjacent every other groove distend circumferentially and move radially outwardly and into tight sealing engagement with a tubular structure in radial spaced relationship about the packer assembly, and sealing means carried by the lower end of the cage to engage and seal with the body, said sealing means including a downwardly opening socket in the lower end of the cage, an annular packing ring in the socket engaging the body and a follower nut threadedly engaged in the socket to engage and retain the packer ring.

References Cited

UNITED STATES PATENTS

| Re. 20,497 | 9/1937 | Johnson | 277—208 X |
| 220,461 | 10/1879 | Eaton | 277—208 X |
| 1,502,372 | 7/1924 | Callanan | 277—116.8 |
| 3,282,346 | 11/1966 | Claycomb | 277—116.6 X |
| 3,292,938 | 12/1966 | Tamplen | 277—116.6 X |

LAVERNE D. GEIGER, Primary Examiner

J. S. MEDNICK, Assistant Examiner

U.S. Cl. X.R.

166—196; 277—208